May 28, 1935.  J. D. BASSON  2,002,498
PROJECTING MACHINE AND THE OPTICAL SYSTEM THEREFOR
Filed Dec. 29, 1931  2 Sheets-Sheet 1
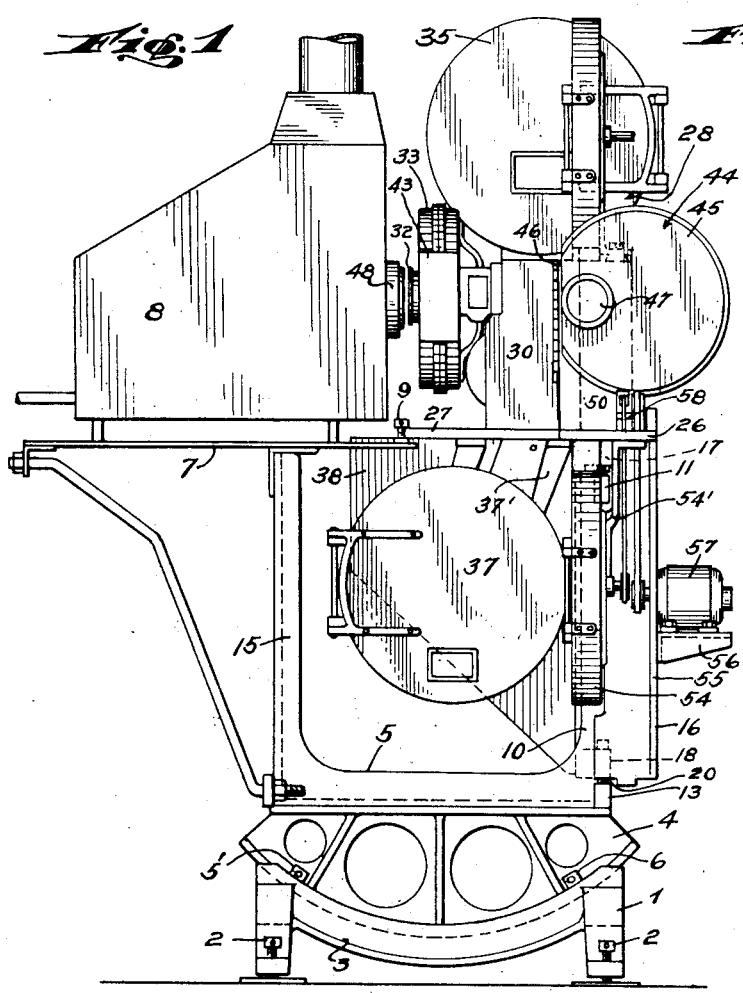
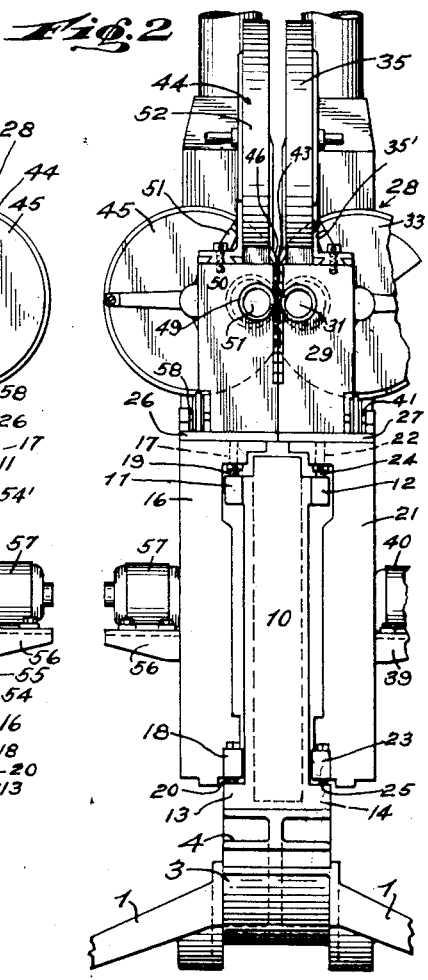
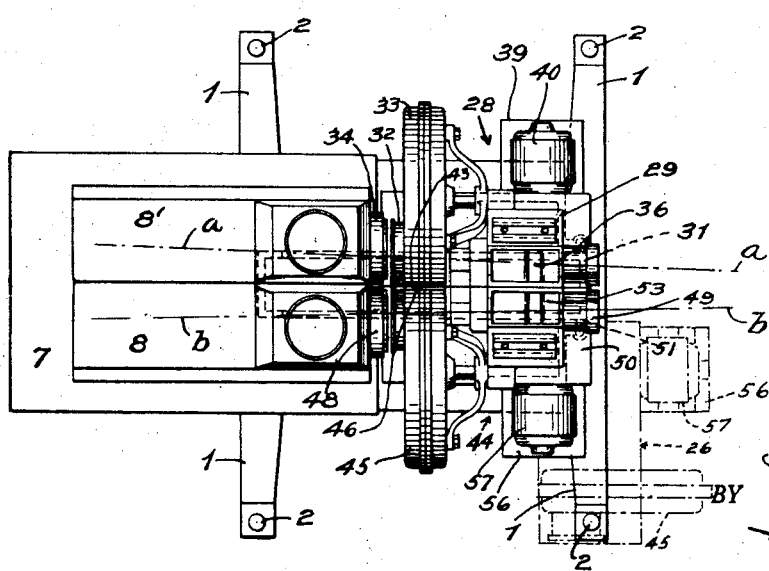
INVENTOR.
JOSEPH D BASSON
BY Gustav Drews
ATTORNEY

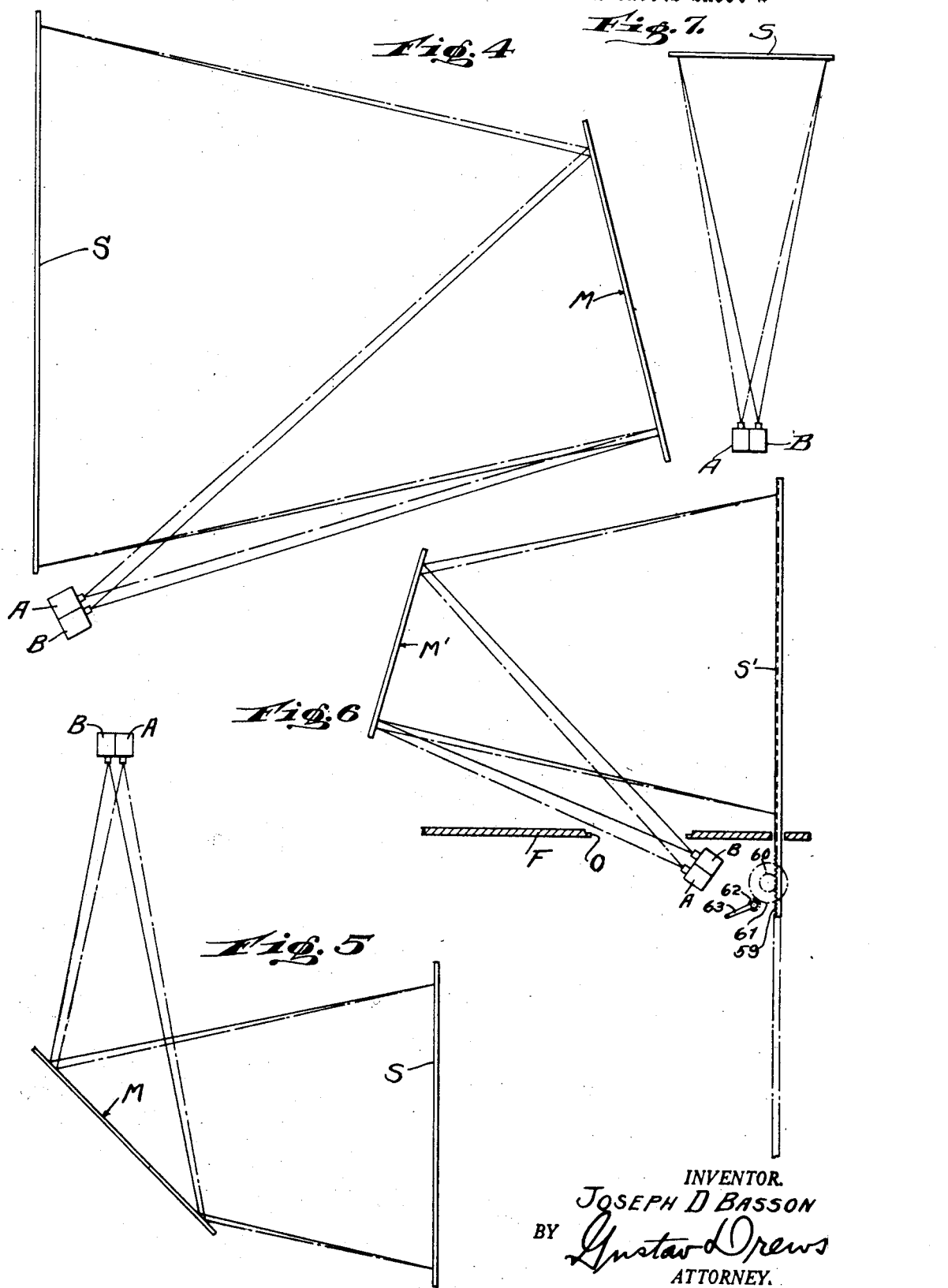

Patented May 28, 1935

2,002,498

UNITED STATES PATENT OFFICE 2,002,498

PROJECTING MACHINE AND THE OPTICAL SYSTEM THEREFOR

Joseph D. Basson, New York, N. Y.

Application December 29, 1931, Serial No. 583,669

7 Claims. (Cl. 88—24)

This invention relates to projecting machines and the optical systems therefor.

Among the objects of the present invention, it is aimed to provide a projector and an optical system particularly suited for rear projection where only a limited area to the rear of the sceen is available by means of which a change from one film to another may be made with facility and without any appreciable distortion and in which projecting lenses of the standard focal length may be used in order to obtain maximum definition and light intensity.

Specifically the present invention aims to provide a frame and two projectors, one having a right hand head and the other having a left hand head in which the projecting lenses are disposed adjacent to one another with a minimum amount of intervening space, with the film driving mechanism disposed outwardly when in projecting position and which projectors are pivotally mounted on said frame to afford access to the film for threading the same.

The present invention also aims to provide a frame that is angularly adjustable and two projectors, one having a right hand head and the other having a left hand head in which the projecting lenses are disposed adjacent to one another with a minimum amount of intervening space, with the film driving mechanism disposed outwardly when in projecting position and which projectors are pivotally mounted on said frame to afford access to the film for threading the same according to which the position of the frame will simultaneously determine the position of the two projectors relative to the screen without any appreciable distortion.

This invention still further aims to provide an optical system including two projecting lenses having the standard focal length of two projectors respectively, one projector having a right hand head and the other having a left hand head in which the lenses are disposed adjacent to one another with a minimum amount of intervening space, a screen, and an intervening mirror for receiving the images from either of said lenses and simultaneously when changing from one lens to the other and deflecting them onto said screen without any appreciable distortion.

It is still another object of the present invention to provide an optical system including the two projecting lenses having the standard focal length of two projectors, one projector having a right hand head and the other having a left hand head in which the lenses are disposed adjacent to one another with a minimum amount of intervening space, a screen, and an intervening mirror for receiving the images from either of said lenses and deflecting them onto said screen without any appreciable distortion, in which the frame for the two projectors may be located to either side of the space disposed between the screen and deflector or to the top or bottom of the space disposed between the screen and deflector, whether to the front or rear of the screen.

Specifically it is an object of the present invention to provide an optical system including the two projecting lenses having the standard focal length of two projectors, one having a right hand head and the other having a left hand head in which the lenses are disposed adjacent to one another with a minimum amount of intervening space, a screen and an intervening mirror for receiving the images from either of said lenses and deflecting them onto said screen without any appreciable distortion, in which the screen is slidably mounted to be lowered below the floor and the frame for the two projectors may be located to either side of the space disposed between the screen and deflector, or to the top or bottom of the space disposed between the screen and deflector, whether to the front or rear of the screen.

The invention still further aims to provide a projecting device having a main frame to which are secured supports having a plurality of film feeding devices, at least one of which supports is pivotally connected to said main frame so that the film feeding device mounted thereon may have its projecting lens and consequently the door affording access to the film therein disposed adjacent to and adjoining the film feeding device when the support is preferably locked to said main frame in projecting position and which support on the other hand is free to be swung outwardly when liberated from said frame to clear the door of the film feeding device mounted on such pivotally connected support.

Another main object of the present invention is to provide a projecting machine having a main frame to which are pivotally secured two supports for two film feeding devices respectively, which film feeding devices will be disposed adjacent to one another with their projecting lenses in close proximity to one another when the supports are locked to said frame in projecting position and which supports are free to be swung outwardly when liberated from said frame to clear the doors of the film feeding devices.

It is still another object of the present invention to provide a two projector device having the focal axes thereof inclined to one another to facilitate alternately using either of said projectors with respect to a given screen area from a predetermined position of the frame without changing its position when alternating from one projector to the other, said main frame having pivotally connected thereto two supports for receiving the film feeding devices of the projectors and to facilitate locating them in a predetermined projecting position relative to said frame and to swing the same outwardly to facilitate access to the interior of said film feeding devices when desired.

It is still another object of the present invention to provide a projector system whereby the length of throw of the light rays may be reduced to a minimum and the area through which the light rays pass reduced to a minimum without disturbing the normal operation of the projectors, this being made possible by directing the images onto the rear of the screen by the intervention of a single mirror, in which case the films will pass through the projector devices as they do normally through a standard projector and the images thereof appear on the display face of the screen in their normal position.

It is still another object of the present invention to provide a projector system whereby the length of throw of the light rays may be reduced to a minimum with a two projector device to serve the small theatre limited as to space without danger of distortion or of hampered operation.

These and other features, capabilities and advantages of the invention will appear from the subjoined detail description of specific embodiments thereof illustrated in the accompanying drawings in which Figure 1 is a side elevation of the frame and projectors used in the present invention;

Fig. 2 is a front elevation of the same;

Fig. 3 is a plan view of the same with the upper magazines removed;

Fig. 4 is a plan view of one embodiment of the optical system including the projectors in which the projectors are disposed to one side of the screen and the intervening mirror is disposed at an angle less than forty-five degrees to the screen;

Fig. 5 is a plan view of another embodiment of the optical system in which the intervening mirror is disposed at an angle of forty-five degrees to the screen and the projectors direct the light rays substantially at an angle of ninety degrees to the direction of the light rays from the mirror onto the screen;

Fig. 6 is a diagrammatic side view of still another embodiment of the optical system including the two projectors in which the projectors are disposed beneath the floor of the stage and the light rays therefrom extend up through the floor of the stage onto the intervening mirror and the screen is mounted to be lowered beneath the stage when out of use; and Fig. 7 is a plan view of still another embodiment of the two projector device in which the projection is made directly onto the screen either to the rear face of a translucent screen or to the front face of an opaque screen.

The projecting mechanism illustrated in Figs. 1, 2 and 3 consists essentially of a cradle 1 which is preferably secured to the floor by set screws 2. The cradle 1 is provided with an arcuate supporting guideway 3 in which the extension 4 is adjustably mounted, it being provided with the set screws 5' and 6 for anchoring the extension 4 in the guide 3 according to the angular position of the projecting lenses of the machine.

The extension 4 is secured to the lower end of a frame 5 having a rear platform 7 for receiving the lamp housings 8 and 8', at the front of which platform 7 there are secured two set screws 9. The front of the frame 5, to wit the extension 10 has formed at its upper end to either side thereof the journals 11 and 12 and at its lower end extending to either side thereof the journals 13 and 14. The extension 10, see particularly Fig. 1, is spaced from the extension 15 of the frame 5 to form a chamber therebetween.

On the journals 11 and 13 is mounted the frame member 16, it having journals 17 and 18 which are connected to the journals 11 and 13 by the pintles 19 and 20 respectively. On the journals 12 and 14, there is pivotally mounted a frame member 21 similar to the frame member 16 which is provided with journals 22 and 23 connected to the journals 12 and 14 by the pintles 24 and 25 respectively.

The frame members 16 and 21 are provided with platforms 26 and 27 respectively which when swung inwardly into projecting position engage one another and at their rear ends are located in place by the set screws 9.

The platform 27 has mounted thereon a standard projector 28, such for instance as the well known Simplex projector which consists essentially of a main housing 29 having pivotally mounted thereon a door 30 on the right side thereof when looking at the front of the machine, in which housing adjacent to the right side thereof, there is mounted the objective lens 31 registering with the window formed in the frame 32 of the fan housing 33, in turn registering with the aperture formed in the frame 34 of the lamp housing 8'.

In these standard projectors, the drive gearing for the film feed and gate are generally mounted to the left of the lens 31 and away from the door 30 so that by opening the door 30, access to the film can be readily had for the purpose of threading the same when supplying a new film.

On the housing 29 to the left side thereof, there is secured the supporting foot 35' of the upper magazine 35 which registers with the opening 36 formed in the top of the housing 29.

Below the platform 27, there is preferably mounted the magazine 37 for the take-up reel which in the present instance is secured to the lower surface of the platform 27 by the bracket 37'. Extending from the plate 38 to the left thereof and below the platform 27, there is provided the short platform 39 on which is mounted a motor 40 which is connected to the main driven shaft 41 of the drive gearing in the housing 29. The fan housing 33 of this projector has its right hand end cut off at 43 so that this housing will not extend over into the path of the light rays from the adjacent projector.

On the platform 26 of the frame 16 there is mounted another projector, to wit the projector 44 and its fan housing 45. Its fan housing 45 has its left hand side cut off at 46 disposed adjacent to the cut off portion 43 of the fan housing 33. This fan housing 45 has a window 47 to register with the light aperture in the frame 48 of the housing 8 and the objective lens in the frame 49 of the housing 50.

The projector 44 is constructed practically the reverse of the projector 28 and for convenience will be described as having a right hand head instead of a left hand head, as the construction of the projector 28.

This reverse construction of the projector 44 is provided so that the projecting lens 51 in the frame 49 will be disposed as close to the projecting lens 31 as possible to form a part of the optical system hereinafter to be described. This projector is likewise provided with a door, in the present instance on the left hand side of the housing 50 to afford when opened access to the film in the housing 50. On the top of the housing 50, there is secured the support 51 of the magazine 52 which registers with the opening 53 in the housing 50 to permit the film from the magazine 52 to pass down into engagement with the feed mechanism in the housing 50. Below the platform 26 in the present instance, there is provided the magazine 54 for the take-up reel of this projector which in the present instance is secured by the bracket 54' to the lower face of the platform 26 on the left hand side of the vertically extending frame member 55. On the right hand side of the vertically extending frame member 55 and below the platform 26, there is provided a short platform 56 for receiving the motor 57 which is connected to the main driven shaft 58 of the drive gearing in the housing 50.

When the frame members 16 and 21 are in projecting position, as shown in Fig. 2, the magazines 37 and 54 for the take-up reels of the respective projectors 28 and 44 will be disposed in the chamber formed in the frame 5.

With the projector 44, it is of course also obvious as shown in Fig. 1, that when the frame 16 is swung outwardly the door to the housing 50 may be opened in turn to obtain access to the film in the housing 50.

The location of the objective lenses 51 and 31 closely adjacent to one another as illustrated makes possible the optical system now to be described of which these two projecting lenses form an important, if not the important part.

In the first place, attention is called to the fact that the axes of the light rays emanating in the lamp housings 8' and 8 and the focal axes of the respective film feeding mechanisms of the projectors 28 and 44 will be inclined to one another as defined by the dash and dot lines a and b in Fig. 3 converging as they extend from the lenses 51 and 31.

From the foregoing, it will also appear that the pivotally connected platforms 26 and 27 make it possible to anchor the film feeding devices of the respective projectors in a predetermined projecting position relative to the main frame by means of the set screws 9; and that on the other hand even if two identical standard projecting machine heads are used, when the axes of the light rays and focal axes of the same are converged as here contemplated, two very closely positioned projecting lenses can be used and that access to the film in the film feeding mechanism can be had with facility. When a left hand projecting machine head and a right hand projecting machine head are used as here illustrated then access to the film would in both cases be had by swinging outwardly the platforms on which the heads are mounted and if two standard left hand projecting machine heads are used then of course, access to the film could be had to the projecting machine head on the right hand side of the projector without swinging its platform outwardly and only the platform of the other projecting machine head be required to be swung outwardly for the purpose of access.

It is of course well known that in moving picture theatres today, it has been the custom for the convenience of the audience to use two projecting machines which are used successively. The average picture, generally known as a feature in the trade, ordinarily consists of eight film lengths. While the one projector is exhibiting the first film length, the second film length will be mounted in the second projector ready to be projected as soon as the first film length has been completed and very frequently the last few frames are arranged to overlap so that no interruption whatever will take place in the exhibition when changing from one projector to the second or from one film length to the second film length.

In small theatres, especially the type recently made popular, where space is not available in the rear of the theatre, that is to the front of the screen for locating the projectors, attempts have been made to use the so-called translucent screen by means of rear projection and mounting the projectors to the rear of the screen. With these small theatres on the other hand ordinarily there is not sufficient space to the rear of the screen to obtain the required length of throw for producing the magnification required. More recently so-called wide angle or short focal length lenses have been used to reduce the length of throw from the projector to the screen. With these lenses, however, the results have been very unsatisfactory. Definition has been poor and excessive light is lost.

In the present instance, the standard focal length lenses may be used. In order to obtain the required length of throw, an intervening mirror is used. This length of throw is not as long by any means as that ordinarily used when projecting from the rear of the theatre onto the front of the screen. Consequently if the projecting lenses were spaced apart the customary distance with intervening space for the operator between the standard projectors, when switching from one projector to the second, appreciable distortion would necessarily result, since the distance from center to center of the lenses of normally spaced standard projectors is from four (4) feet to four and one half (4½) feet. In the present instance, however, when using a right hand head and a left hand head, the distance from center to center of the lenses thereof may be as little as two (2) inches and consequently the distortion if any is not appreciable.

In the embodiment illustrated in Fig. 4, the projectors A and B are illustrated diagrammatically as having right hand and left hand heads with the projecting lenses adjacent to one another and at one side of the screen S and intervening mirror M. When the mirror is tilted relative to the projectors A, B and screen S as indicated, the distortion if any is so slight that the operator can change from the projector A to the second projector B when changing over from one film length of a feature to its succeeding film length so that the change will not be noticed and as heretofore no interruptions in the exhibition occur. In this instance, the mirror M with the screen S forms an angle less than forty-five degrees.

In the embodiment illustrated in Fig. 5, the projectors A and B are likewise disposed to one side of the screen but in this case the intervening mirror M forms an angle of forty-five degrees with respect to the screen S.

In Fig. 6, the projectors A and B are illustrated as disposed below the floor F of the stage and to the rear of the screen S' with an opening O in the floor through which the light rays from the projectors A, B pass to the intervening mirror M'. The mirror M' in the present instance similar to the embodiment illustrated in Fig. 4, is disposed at an angle less than forty-five degrees to the screen S'. The screen S' in the present instance is preferably mounted on a rigid support having formed thereon a rack or racks 59 in mesh with the gear 60 operably connected to the pinion 61 in mesh with the pinion 62 on the crank 63, such screen S' being suitably guided in its vertical movement when operated by the crank 63.

The screens of these several embodiments may be made of any suitable translucent material. When the screens have been composed of ground glass or the like satisfactory results have been obtained, even if the lamps in the projectors A and B were of the incandescent type.

From the foregoing, it will further appear that with any of the embodiments illustrated, the films may pass through the two projector device in the manner normal with a standard projector ordinarily disposed in the rear of a theatre, projecting onto the display face of the screen by ordinary projection. In other words, with the present invention, the intervening mirror will receive the images in the same way as the ordinary opaque screen receives the images and directs them back onto the front face of the translucent screen to reappear on the rear display face of the translucent screen in identically the same manner as the images would ordinarily appear with the former standard system on the rear display face of the opaque screen.

In the embodiment illustrated in Fig. 7, the two projector device A, B is disposed to project directly onto the screen S without an intervening mirror. By means of this two projector device A, B in which the lenses of the adjacent projectors are spaced apart from center to center from four to two inches, it is of course obvious that distortion will be reduced when projecting directly onto the screen either to the rear face of a translucent screen or front face of an opaque screen as compared to the distortion present in the systems now generally in use when the projecting lenses are spaced from one another as much as four feet or more.

It is, of course, obvious that any standard sound head today in use may be cooperatively associated with this new two projector device without departing from the general spirit of the invention and which may be connected in the manner well known today in the industry.

It is obvious that various changes and modifications may be made to the details of construction without departing from the general spirit of the invention as set forth in the appended claims.

I claim:

1. In a moving picture picture apparatus, the combination with a main frame, of two supports pivotally connected to the front end of the main frame to move outwardly from said main frame about a vertical axis and in turn inwardly to be locked to said main frame adjacent to one another in projecting position, two projector devices, each having a lamp, a light aperture, a projecting lens, and a film feeding mechanism, the lamps being mounted on said main frame and the film feeding mechanisms being mounted on said supports respectively in registration with said lamps in projecting position, the projecting lenses being disposed in close proximity to each other when the supports are locked to the main frame and the focal axes of the projector devices converging in projecting position to alternately project from either projector onto a given screen area, and two parallel adjacent lamp housings mounted on the rear of said frame and in alinement with and adjacent to the rear end of said light apertures when in projecting position, one of said lamps being mounted in each of said housings, said supports when swung outwardly affording access both to the front of said lamps and to said film feeding mechanisms.

2. In a moving picture apparatus, the combination with a main frame, of a projector operatively associated with said main frame having a lamp, a projecting lens and a film feeding mechanism, a second projector having a lamp mounted on the rear end of said main frame, and a support pivotally connected about a vertical axis to the front end of said main frame and supporting the film feeding mechanism of said second projector when locked adjacent to said lamp in projecting position, the support being movable away from said frame to facilitate access to the front of said lamps and to said film feeding mechanisms, the two projectors being disposed closely adjacent to one another with their projecting lenses in close proximity to each other when said support is locked to said main frame in projecting position to alternately project from either projector onto a given screen area.

3. In a moving picture apparatus, the combination with a main frame, of a projector operatively associated with said main frame having a lamp, a projecting lens and a film feeding mechanism, a second projector having a lamp mounted on the rear end of said main frame, a support pivotally connected about a vertical axis to the front end of said main frame and supporting the film feeding mechanism of said second projector adjacent to said lamp in projecting position, the support being movable away from said frame to facilitate access to the front of said lamps and to said film feeding mechanisms, the two projectors being disposed closely adjacent to one another, and means for anchoring said support to said main frame in projecting position with the projecting lenses of said projectors in close proximity to each other when said support is anchored to the main frame in projection position to alternately project from either projector onto a given screen area.

4. In a moving picture apparatus, the combination with a main frame, of two supports pivotally connected to the front end of the main frame to move outwardly from said main frame and in turn inwardly to be locked adjacent to one another in projecting position, two lamp housings and two projector devices, the lamp housings being mounted adjacent to one another on said main frame to direct adjacent parallel beams of light, each projector device being mounted on one of said supports and having a supply reel magazine and a take up reel magazine disposed one above the other to form a vertical path of movement for the film passing from the supply reel to the take up reel, the paths of movement of the films of the projector devices being disposed adjacent to one another, each projector device having an objective lens registering with its film and the beam of light from one of said lamp housings, the lenses being inclined to one another so that their focal axes will converge when in projecting position.

5. In a moving picture apparatus, the combination with a main frame, of two supports pivotally connected to the front end of the main frame to move outwardly from said main frame and in turn inwardly to be locked adjacent to one another in projecting position, two lamp housings, and two projector devices, the lamp housings being mounted adjacent to one another on said frame to direct adjacent parallel beams of light, each projector device being mounted on one of said supports and having a supply reel, a take up reel, a reel driving mechanism, and an objective lens, the supply reel and take-up reel of each projector device being disposed one above the other to form a vertical path of movement for the film passing from one reel to the other, the vertical paths of movement of the films so formed of the adjacent projector devices being disposed substantially in alinement with one another and adjacent to one another, the objective lens of each projector device registering with the beam of light in one of said lamp housings and with the vertical path of movement of its film, the objective lenses being inclined to one another so that the focal axes thereof converge in projecting position, and the driving mechanisms of the respective projector devices being disposed away from the reels so that access to a reel may be had when its support is swung outwardly away from said main frame.

6. In a moving picture apparatus, the combination with a main frame, of two supports pivotally connected to the front end of the main frame to move outwardly from said main frame and in turn inwardly to be locked adjacent to one another in projecting position, two lamp housings, and two projector devices, the lamp housings being mounted adjacent to one another on said frame to direct adjacent parallel beams of light, each projector device being mounted on one of said supports and having a supply reel, a take up reel, a reel driving mechanism, and an objective lens, the supply reel and take up reel of each projector device being disposed one above the other to form a vertical path of movement for the film passing from one reel to the other, the vertical paths of movement of the films so formed of the adjacent projector devices being disposed substantially in alinement with one another and adjacent to one another, the objective lens of each projector device registering with the beam of light in one of said lamp housings and with the vertical path of movement of its film, the objective lenses being inclined to one another so that the focal axes thereof converge in projecting position, a magazine for each reel, and a door for each magazine pivotally mounted to swing inwardly away from a support when such support is swung outwardly away from said main frame.

7. In a moving picture apparatus, the combination with a main frame, of two supports pivotally connected to the front end of the main frame to move outwardly from said main frame and in turn inwardly to be locked adjacent to one another in projecting position, two lamp housings, and two projector devices, the lamp housings being mounted adjacent to one another on said main frame to direct adjacent parallel beams of light, each projector device being mounted on one of said supports and having a shutter housing, a supply reel magazine, a take up reel magazine, a reel driving mechanism, and an objective lens, the shutter housing having a window formed therein, a reel in each magazine, the supply reel magazine and the take up reel magazine of each projector device being disposed above one another to form a vertical path of movement for the film passing from one reel to the other, the vertical paths of movement so formed of the projector devices being disposed substantially in alinement with one another and adjacent to one another, the objective lens of each projector device registering with the beam of light of one of said lamp housings, with the vertical path of movement of its film, and with the window of its shutter housing, the driving mechanisms of the respective projector devices being disposed to extend away from the reels, a door for each magazine pivotally mounted to swing inwardly away from a support when such support is swung outwardly away from said main frame.

JOSEPH D. BASSON.